(12) United States Patent
Meeboer

(10) Patent No.: US 9,069,934 B1
(45) Date of Patent: Jun. 30, 2015

(54) METHOD AND SYSTEM FOR PROVIDING ELECTRONIC CONTENT TO A USER

(76) Inventor: Kip Raymond Meeboer, Marietta, GA (US)

(*) Notice: Subject to any disclaimer, the term of this patent is extended or adjusted under 35 U.S.C. 154(b) by 151 days.

(21) Appl. No.: 13/590,678

(22) Filed: Aug. 21, 2012

Related U.S. Application Data

(63) Continuation of application No. 13/409,891, filed on Mar. 1, 2012, now abandoned.

(60) Provisional application No. 61/447,885, filed on Mar. 1, 2011.

(51) Int. Cl.
| | | |
|---|---|---|
| *G06F 21/10* | (2013.01) | |
| *H04L 29/06* | (2006.01) | |
| *H04L 9/08* | (2006.01) | |
| *G06F 21/62* | (2013.01) | |
| *G06F 21/30* | (2013.01) | |

(52) U.S. Cl.
CPC ............... *G06F 21/10* (2013.01); *H04L 9/0872* (2013.01); *G06F 21/6218* (2013.01); *H04L 63/107* (2013.01); *G06F 21/30* (2013.01)

(58) Field of Classification Search
CPC .............................. G06F 21/10; G06F 21/6218
USPC .......................................................... 726/26
See application file for complete search history.

(56) References Cited

U.S. PATENT DOCUMENTS

| | | | | |
|---|---|---|---|---|
| 6,243,450 | B1* | 6/2001 | Jansen et al. | 379/144.01 |
| 6,792,401 | B1* | 9/2004 | Nigro et al. | 703/6 |
| 7,647,233 | B2* | 1/2010 | Kadaba et al. | 705/1.1 |
| 7,734,779 | B1* | 6/2010 | Piccionelli | 709/225 |
| 2008/0033814 | A1* | 2/2008 | Carignano | 705/14 |
| 2008/0195546 | A1* | 8/2008 | Lilley | 705/59 |
| 2009/0070412 | A1* | 3/2009 | D'Angelo et al. | 709/203 |
| 2011/0112866 | A1* | 5/2011 | Gerrans | 705/3 |
| 2012/0059911 | A1* | 3/2012 | Randhawa et al. | 709/219 |
| 2012/0130810 | A1* | 5/2012 | Kilgore et al. | 705/14.53 |

FOREIGN PATENT DOCUMENTS

KR 20070081787 A * 8/2007

* cited by examiner

*Primary Examiner* — Mohammad L Rahman
(74) *Attorney, Agent, or Firm* — Smith Risley Tempel Santos LLC; Gregory Scott Smith

(57) ABSTRACT

A method and system for providing a user with digital content includes a user interface provided to a user for allowing the user to be presented with the digital content. The method and system includes receiving authentication information from the user and authenticating the user if the authentication method correctly corresponds with previously stored information of the user. As a result, the user has access to the digital content, wherein the digital content is information from a third party, e.g., a vendor of goods or services or information provider, based on a user profile which comprises user preferences. The digital content is then presented to the user interface.

26 Claims, 3 Drawing Sheets

METHOD AND SYSTEM FOR PROVIDING ELECTRONIC CONTENT TO A USER

CROSS REFERENCE TO RELATED APPLICATIONS

This application is a continuation of application Ser. No. 13/409,891, filed Mar. 1, 2012, now abandoned which claims priority to U.S. Provisional Patent Application Ser. No. 61/447,885, filed Mar. 1, 2011, herein incorporated by reference.

FIELD OF THE INVENTION

The present invention relates to a method and system for providing digital content to a user through a user interface from a processor having access to digital content, in particular, providing electronic content to a user in which the content is from third-party vendors or service providers, based on digital information provided by the user interface to the processor and a user profile containing user preferences.

BACKGROUND OF THE INVENTION

The age of digital communication, including information provided through the Internet, has advanced to offer boundless opportunities for a person to seek and be provided with information. However, despite all these advancements, digital communication, including information on the Internet, is not available to all people and does not provide comprehensive and convenient access to useful information regarding local resources, points of interest or events.

In order to have access to digital content on the Internet, as an example, one must have access to a user interface which is connected to the Internet. The user interface may include a client computer, such as a laptop, a tablet or smartphone, a desktop computer, a video gaming console, and the like, and some connectivity to the Internet, which includes, but is not limited to, a Wi-Fi connection, a broadband connection, a cellular communication connection, etc. In almost all cases, a user must personally own one or both the computer hardware and/or access to network infrastructure connected to the Internet in order to receive digital communication. Therefore, even if the content of the digital communication is free, e.g., a public website which does not require a fee in order to gain access to its content, a user must pay for either the hardware and/or the Internet connection in order to gain access to that content.

Further, the ability to access information at any time and in any place is still very dependent on the ability of a user to assemble a collection of devices or services, all of which require specialized configuration to use.

In addition, a user may not be readily able to receive desired content from the Internet. For example, if a user knows what he or she is looking for, a user can use a search engine, such as Google or Yahoo, to specifically search for content. However, often a user may not be aware of useful information since he or she did not enter a search which returned the helpful information.

As a result of each of these factors, the cost, effort and time required to fully integrate devices and services, all hamper the ability of a user to be provided with digital content which a user would find desirable.

Mobile information access, such as via smartphones and other Internet enabled mobile devices, is not currently generally present at a level that makes digital communication available to the general public. However, the deployment of single or limited purpose machines throughout the world with Internet access or distributing information capability is now expanding the access of digital communication. These devices include point of sale machines, kiosks, ATM machines, public Internet cafes, self-service photography printing, fuel dispensers (commonly referred to as gas pumps), and the like. Unfortunately, all of these devices lack integration with one another.

There is a need for integration of a disparate collection of devices, such as devices connected to the Internet, to allow for optimization of resources and to provide vast and relevant information to the general public at little or no cost to the user.

SUMMARY OF THE INVENTION

The present invention is directed to a method and system for providing a user with access to electronic, e.g., digital, content, including through many public accessible computer terminals, such as limited purpose devices, connected to the Internet. Alternatively, the digital content may be provided to a user owned device, such as a laptop, tablet or smartphone, through a free Wi-Fi connection or Internet connection, thereby allowing the content to be provided to the user.

In one embodiment of the present invention, the computer terminal or kiosk is wholly, or in part, subsidized by revenue received from vendors who present content to the computer terminal or kiosk. In addition, the Wi-Fi connection or internet connection to a user's personal device, such as a smartphone, may be subsidized through revenue collected from a digital content provider, such as a third-party vendor of goods and services.

The digital content includes information from a third party, provided to the user, based on a user profile which comprises user preferences to correspond to the information requested and provided by third parties.

The first time a user uses the method, the user provides authentication information to create a user account and user preferences to create a user profile. For example, a user may be prompted to provide information, including his or her gender, age, food preferences, recreational activities, etc. From the information received, the user profile is created. Subsequently, when a user accesses the system, either using the same user interface or another interface that has access to the user profile, the user will be provided with relevant digital content.

In order for the user to be provided with the digital content, the user uses a user interface, such as a kiosk, computer terminal, client computer, or the like, and provides authentication information through the user interface to one or more processors having access to digital content. The authentication information also may identify the specific user interface, including its location, to the digital content provider, and may also include a username and password. Alternatively, authentication may include a user swiping his or her personal credit card or hotel room access key card, or waving a gasoline key fob, using RFID or other emerging authentication technologies, or the like, by an appropriate sensor. The identity of the digital user interface and the authentication information is compared with a database and, if the user is in the database, the user is provided access to content that corresponds to the user's profile and preferences, if any.

The present invention, in one form, relates to a method for providing electronic content to a user, based on a user profile. The method includes providing a user interface for allowing the user to be presented with digital content. The method further includes determining a location for the user and receiving authentication information from the user and authenticating the user if the authentication information correctly corresponds with previously stored information regarding the user. As a result, the user is provided access to the digital content, wherein the digital content is information from a third party, based on a user profile which corresponds to user preferences and the location of the user. The digital information is then presented to the user interface.

In one specific further embodiment, the method further includes soliciting specific, relevant content from third parties, which content may be accessible to the user if it corresponds to the user profile. In one further specific embodiment, the solicited content includes specific, relevant content also related to certain user interface criteria, such as location, time, weather, and the like. In one further specific embodiment, the solicited content is conducted in real time, following a user requesting access to the digital content.

The user interface may be a computer network connection to a client device owned by the user and/or the user interface may be a kiosk or client device, both of which are not owned by the user, but to which the user has access, in order to be provided with the digital content.

In a further embodiment, the authentication information may be the username and password. Alternatively, the authentication information may comprise indicia stored on identification of the user, which includes, but is not limited to, a personal credit card, hotel key, merchant reward card/key fob, and a gasoline company key fob.

The present invention, in another form thereof, relates to a system for providing electronic content to a user, based on a user profile. The system includes a user interface, a computer database, and a processor. The processor is for executing instruction for receiving authentication information from a user, authenticating a user, and presenting the use with digital content through the user interface, based on the user profile and the location of the user.

The present invention, in another form thereof, relates to a method for providing electronic content to a user, based on a user profile. The method includes providing a user interface for allowing the user to be presented with digital content. The user interface is provided, in part, from revenue collected from at least one third-party vendor which provides the digital content. The method further includes receiving authentication information from the user and vendor content from at least one third-party vendor. The vendor content includes at least a product or service and its associated information, offer, or call to action. The user is authenticated if the authentication method correctly corresponds with previously stored information of the user, thereby allowing the user access to the content. The content is information from at least one third-party vendor, based on a user profile which comprises user preferences and the offer or information on the vendor goods or service. The vendor content is presented to the user interface. In one specific further embodiment, the method further includes presenting vendor content for a good or service at a price between a base price and a best price for the good or service, inclusively, based on a price of another vendor's good or service.

BRIEF DESCRIPTION OF THE DRAWING

The invention will be explained in more detail below, with reference to particular preferred embodiments, as well as the drawings in which.

Figure 1:
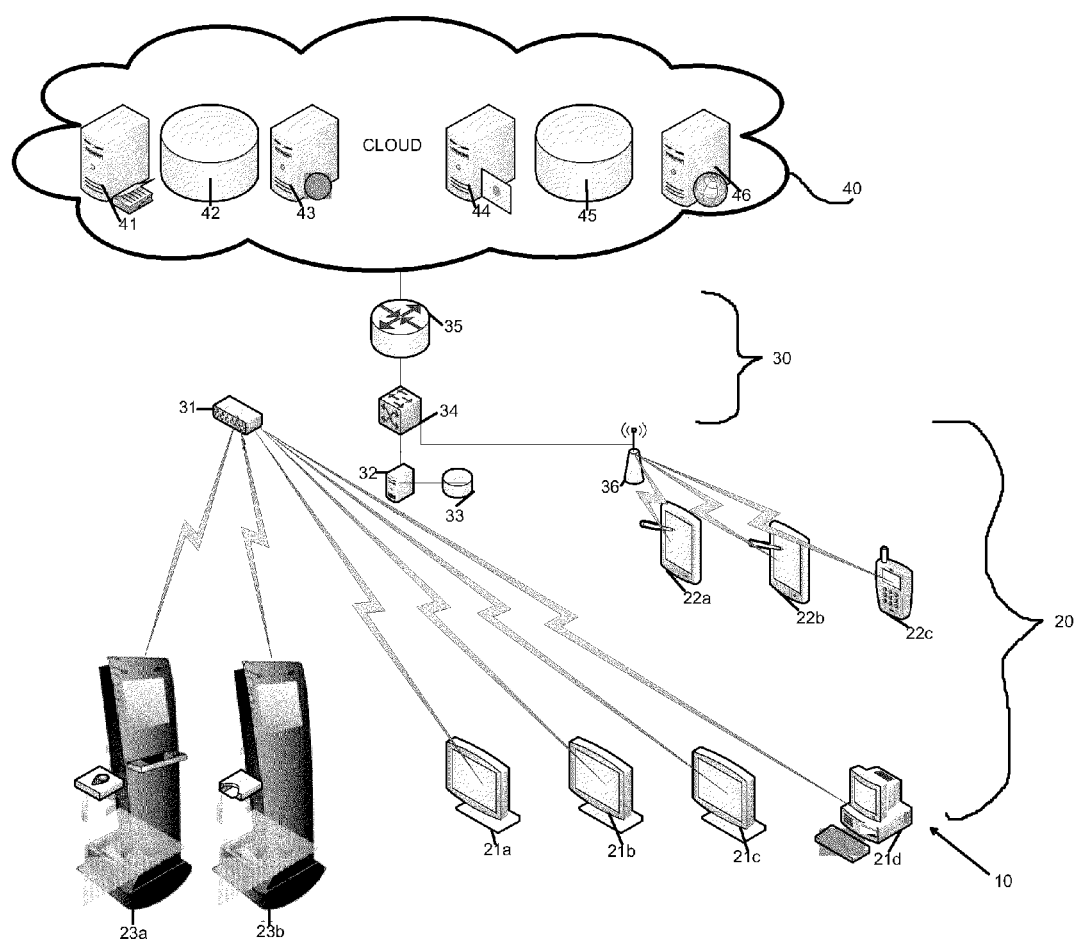
FIG. 1 shows a system for providing content to a user, in accordance with the present invention.

Other embodiments and features of the present invention will become apparent from the following detailed description, considered in conjunction with the accompanying drawings. It is to be understood, however, that the drawings are designed as an illustration only and not as a definition of the limits of the invention.

DETAILED DESCRIPTION

The present invention will now be described with reference to the figures and, in particular, FIG. 1. System 10 depicts a number of different user interfaces 20 which a user can use to be provided with digital electronic content. The user interfaces, as used throughout the present disclosure, refer to either or both the hardware, such as personal computers, with various input devices, including touchscreen, wireless keyboards, and other pointing devices 21a, 21b, 21c, 21d; tablets, laptops, smartphones or PDAs 22a, 22b, 22c; and/or standalone public terminals, such as kiosks 23a, 23b. It will be understood by those skilled in the art that the standalone public terminals may be single purpose terminals for use with the present invention or may be terminals otherwise intended to provide Internet connectivity for other purposes, such as facilitating electronic credit or debit device transactions, dispensing products, such as fuel, or providing other digital information, such as airline, hotel or rental car information. In order to obtain the broadest public access by users to the system and method of the present invention, the public terminals should be ubiquitous, enabling the user quick and convenient access through the day and during the course of multiple daily activities, regardless of personal location or proximity to any personal computers or smartphones.

The user interface 20 also refers to the network connectivity 30 between the client devices, e.g., personal computers 21, and the servers 40 containing the digital or electronic content, depicted as a "cloud." The network connectivity 30 includes representative routers, switch and hub 31, 34, 35, connectivity can also be through any other means to remote servers, such as satellite remote servers 32-33 and wireless access point(s) 36.

Servers 40 contain the digital content which is stored in computer memory and identified as servers 41-46. The servers 41-46 have a respective processor and computer memory known in the art in order to facilitate the presenting of digital content to the user interface.

Although FIG. 1 shows a plurality of possible servers 41-46, each of which may contain a plurality of different databases, one readily understands that, rather than having a series of different databases and servers, the number of servers and databases can be reduced or expanded, as necessary, in order to facilitate providing a user with the digital content.

Figure 2:
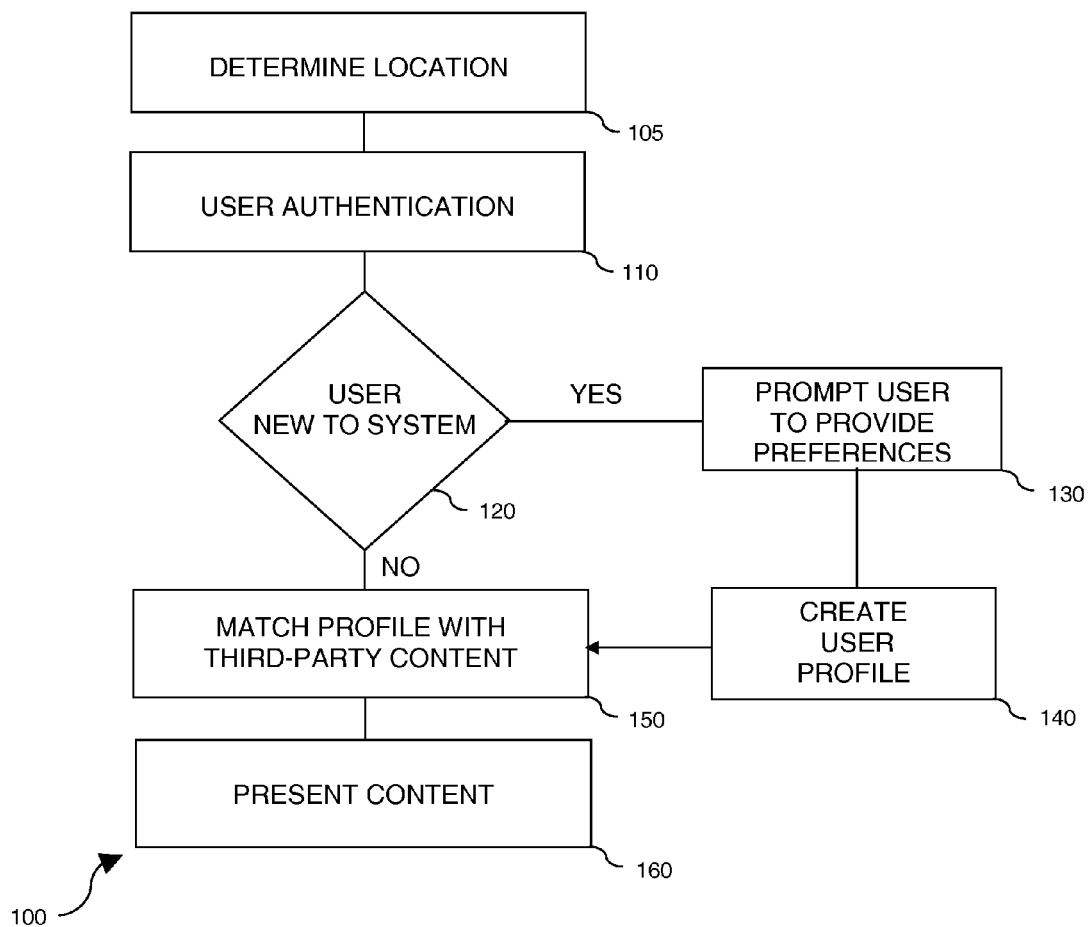
FIG. 2 is a flowchart of one method, in accordance with the present invention.

Referring now to FIG. 2, along with FIG. 1, method 100 allows a user to be presented with digital electronic content. Method 100 first determines the location of the user interface (step 105). Location may be determined by any conventional means which includes, but is not limited to, GPS embedded in the user interface 20, location associated with the IP address of the user interface 20, location of cellular telephone tower 36, etc. Using the user interface 20, a user provides authentication information (step 110). The user authentication may be a user entering his or her username and password. Alternatively, the user authentication may be provided by a user swiping his or her credit card, access key (such as a hotel room key), or passing a key fob (such as those provided by gasoline companies) by a sensor associated with a user interface 20 in communication 30 with at least one server 40 containing the user profile (step 110). The user authentication information is compared with information stored in computer memory in server 40 (step 110).

If this is the user's first time using the system 10 (step 120), the authentication step 110 will fail and the user will be prompted to provide user preferences (step 130) in order to create a user profile (step 140). For example, the user may be prompted to provide responses to gender, food preferences, recreational activities, etc. (step 130). The user's personal preferences are intended to counteract the effect of predictive, push advertising initiated by Internet service providers, based primarily on advertisers mass marketing to consumers based on past Internet search activity, may be as detailed or as limited as desired by the user and should be chosen to enable the selection of the most relevant and desirable electronic content from third-party vendors. Personal preferences also may be used to exclude delivery of certain inappropriate information. For example, persons seeking to stop using tobacco products or alcoholic beverages can exclude content relating to those products. Preferences also may specify certain information, including governmentally provided information, such as the location of public facilities and services or the location of appropriate available day jobs from the unemployment office, based on employment status. The information will be sent from the user interface 20 to the server 40, whereby a user profile will be created (step 140).

If the user is not new to the system 10 (step 120), the user profile will be matched with third-party content (step 150). The content can be either previously stored in memory in server 40 or the content can be generated in real time, following user authentication or the user providing and/or updating his or her profile. As will be discussed below, the public terminals may be subsidized, wholly or in part, by revenue provided from the third-party vendors. Because the preferences indicated by the users will uniquely correspond with the goods or services provided by the respective third-party vendors, the delivery of each piece of digital content containing information responsive to the preferences will result in an extraordinary marketing opportunity to the third-party vendor. Likewise, even as to governmental entities, the communication of relevant information directly to an appropriate user will reduce cost of public mass dissemination of that information, thereby providing an economic savings and benefit to the government and its taxpayers. These economic benefits and savings to commercial and governmental vendors alike will justify subsidizing the installation of ubiquitous public terminals capable of delivering timely, relevant and comprehensive digital information to users. The matching of user profile with third party information can be based on information in the user profile, as well as additional information, including, but not limited to, the specific location of the user interface, time of day, temperature, weather conditions, and the like, in order to provide a user with relevant content (step 160). By doing so, the relevancy, timeliness and effectiveness of the communication is maximized. Additionally, by delivery of relevant digital information corresponding both to the user's preferences and also the user's location, the third-party vendors are more likely to subsidize the public terminal because by providing location centric information and advertising, even small businesses for which nationwide Internet advertising is either impractical or prohibitively expensive will be able to complete efficiently with larger national businesses, even as to local business. The value of targeted advertising bringing in customers for the first time, or reminding them of nearby local businesses, will justify a larger commitment to subsidize the system and method of the present invention by local businesses.

In addition to being provided with relevant content based on the user profile, the user may optionally be provided with additional functionality, such as the ability to browse the Internet, send and read email, and access to other content on the Internet (step 160).

The information, i.e. content, in one advantageous form, is provided free to the user and the user is provided free access to the user interface 20, e.g., on a public access device, client computer, kiosk, or the like, and/or is provided preferably at no additional expense with network connectivity 30 between a user's own device and server 40, in order preferably to be provided with free content to the information provided on server 40.

The content is advantageously free to the user since the third-party vendors or service providers are charged a fee for providing information to system users. It will be understood by those skilled in marketing and advertising that this fee may take different forms, e.g., pay per view fees, at rates determined by the market for such marketing or advertising. The fees collected from each vendor allow the owners and operators of the user interface devices 20 to deploy the user interface 20, at no cost to the user. The advantage to the third-party vendors or service providers, in exchange for the fee, is that that the vendors' information is specifically targeted to users which are the vendors' potential customers, as determined from the user's profile, as set forth above.

The present method can be used to provide a uniform, universal interface experience to the user on numerous different user interfaces 20. The present method can also integrate a user profile from one user interface, say kiosk 23b, to another user interface, e.g., desktop computer 21a, as desired by a user. For example, a user profile associated with a hotel kiosk, e.g., kiosk 23a, can be linked to, or integrated with, a kiosk of a rental car company, a gasoline company, or an airline, say kiosk 23b, as the user travels from one location to another on business or for pleasure.

The present method can be integrated or extended to provide the same function as provided in a single-function kiosk, such as those provided by airlines for flight check in. If a user's profile indicated membership or affiliation with an airline, and the user chooses to place that information in the user profile, then upon authentication at any device within the system, the user will be presented with the same functions that one would expect at an airline owned kiosk. They will, however have the expected system functions as well, thus maintaining the uniform format of content display and delivery. In the emerging deployment of Internet connected cars, the present method could be integrated with the user's rental car information and the car itself, using an Internet access device in the car, that could be authenticated for the entire rental period to provide a user interface to the system to provide electronic information, based on user preferences, as the user moves from one location to another, keeping the user informed of the information most relevant and timely to the user. Similarly, the display screen in front of the user on an airline flight could be configured as a user interface to providing the user with information on destination and plans upon arrival at the destination. This user interface also could be authenticated for user throughout the duration of the flight.

Figure 3:
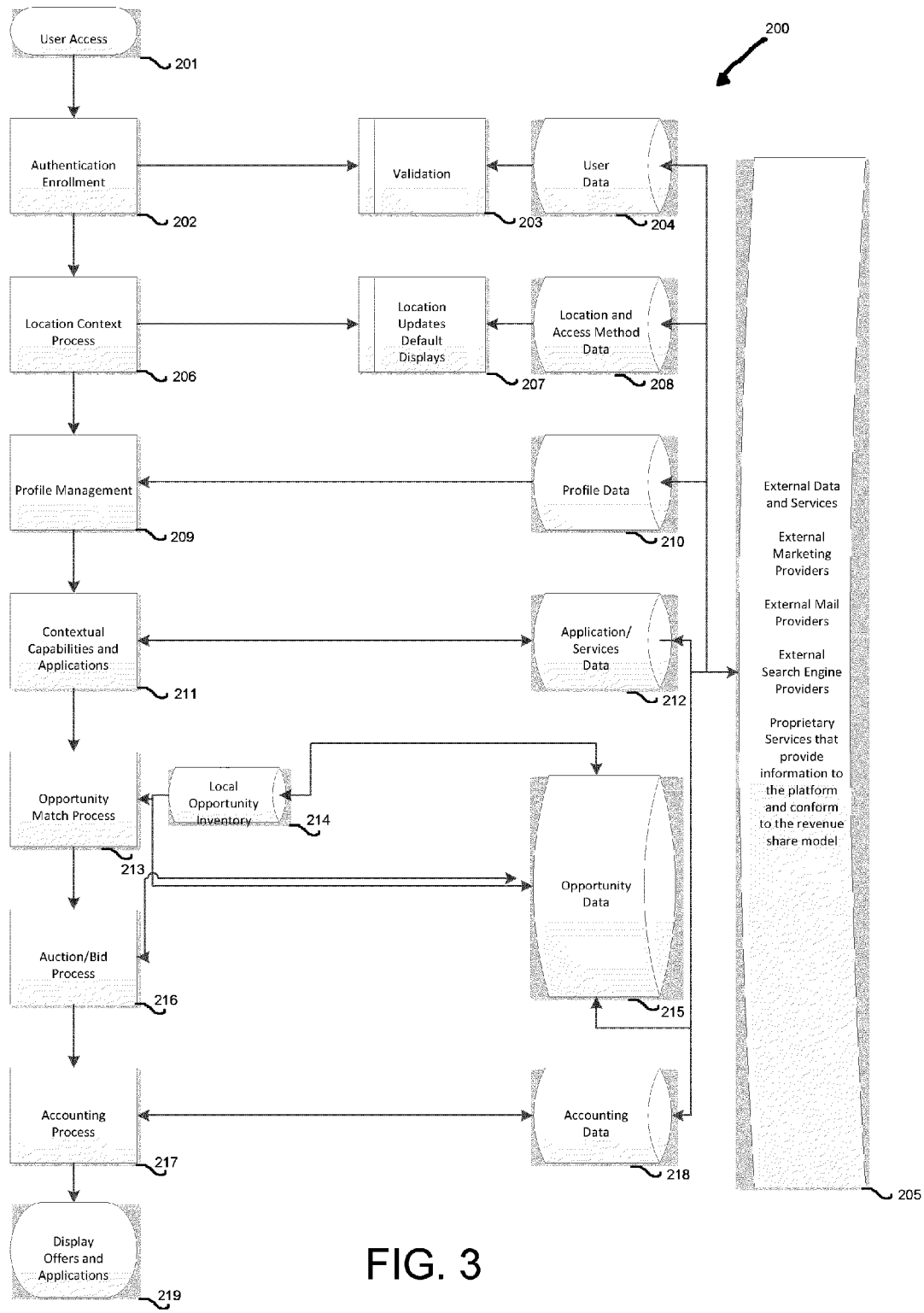
FIG. 3 is another flowchart, in accordance with another aspect of the present invention.

Referring now to FIG. 3, method 200 describes an example of the implementation of the present method. User access is presented by either walkup to an existing terminal/monitor/display device (i.e. client device) that can be a standalone kiosk (23a, 23b), or incorporated into other systems, such as a gas pump, vending machine, or television set with onboard computer (step 201). Such devices can be deployed in a manner similar to a public pay phone. The cost to deploy a public access device can be underwritten from a location sponsor which supports the platform by use of a ground lease and revenue share agreement, similar to other vending machine models (step 201). This vending machine does not take money from the users, but instead vends information, for which the ground lessee is ultimately compensated through the system by the third-party vendors which have paid to have information presented on the system or by the method of the present invention.

The user is authenticated by any common means that the client device 20 supports and is known to the user from previous sessions or enrollment methods (step 202). A new user is presented with basic functions and the opportunity to enroll (step 202). Initially authentication will be username or userID and password; however, any popular method, including the use of smart cards, driver's license, embedded RFID, etc. (step 202).

Validation (step 203) is a continuing process to continually confirm the user identity towards providing additional levels of service and application use as a result of positive identification. Validation is multi-level and serves many purposes. As a user increases his or her validation, the created user profile, in turn, has higher value to the advertisers (step 203). This higher value results in more appropriate targeted offers, higher revenue to the system 10, and higher sales closure rates for the advertiser.

Data for the user is maintained in a database, such as the one of server 40 (step 204). The database may be self-contained or a federated system across multiple identity vaults or databases that have a positive identity association with the user, such as a hotel or car rental account, driver's license, or financial institution (step 204). A federated example might be that a user is a Google centric Internet user and chooses to use his or her Google credentials to log in (step 204). This would then be a pass through to Google for authentication of the credentials The information would be affiliated with the user profile in the user data (step 204). As a result, a user would not be required to provide credentials at each new request (step 204). This is known as single sign on or password management and is a common practice to authenticate a user.

While method 200 uses commonly accepted authentication methods in the art, to create a user profile, method 200 can augment the user data (e.g., user profile) with the specific declared preferences for pre-scriptive advertisements (step 204). The term pre-scriptive means those things that a user has indicated an interest/need/association with that the user would desire to opt-in to receive information about opportunities that are contextually relevant at this point of service (step 204).

External services and data are leveraged across the spectrum of the Internet for data, services, applications, authentication, data storage, and other common Internet services (step 205). External services are inclusive of all Internet information and services, now and in the future (step 205). The purpose is to provide a vendor neutral platform that allows the platform to be a services broker and vendor consolidator with the contextual service of presenting pre-scriptive offers or information (step 205).

The advertisers of products and services (e.g., third-party vendors) compete for being presented to the user (step 205). As noted above, costs for providing content are not passed on to the user, in one embodiment. Search engines will all be accessible on system 10, but since system 10 is provided for the sole purpose of free public access, the search providers (e.g., Google and Yahoo, which use advertising as their revenue model), will share a small part of their revenue based on that session. Users will have a choice of which search engine they prefer (user preference profile). Users also will have similar choices of external services such as mail, music, and photo storage among the many suppliers of these services. The system is vendor neutral, leaving such choices to the user (step 205).

A lack of cost to the user is the key to the public good of the system 10. This method is analogous to over the air television broadcast (broadcast television), in which a choice of content is supported by the sub-set of viewers that respond to the commercial advertisements on that channel.

The location context process (step 206) determines the context in which the user is matched to information or content to be sent to the user. The context includes location capabilities, time of day, distance from home, method of authentication, and data security available for the purposes of applications needing more or less security for access (step 206). If the context is at a gas station fueling pump, then one of the contextual constraints is limited time of use, so the session is designed to be short (step 206). Context may include the gas receipt as a printer for the purposes of printed offers or directions to a restaurant opening (step 206). If the context is a client device 20 within a hotel room, then the session can be longer and be expected to support many more applications, including devices such as a wireless keyboard, printer, web cam, etc. (step 206).

Context also always includes the vendor's, e.g., a sponsor's, preferences, such as a convenience store promotional offers, or a National Park's points of interest map (step 206). Other sponsor context may include the ability to purchase goods or services at a kiosk 23.

The context at a given location includes integration points (step 206). For example, an airline kiosk could check one's bag, show any priority email, let a user know others that the user knows just checked in, order the user coffee on the other side of security in advance, and mark it on the boarding pass for pickup (step 206). Context also includes how far the user is from home (e.g., zip code comparison) and can use this context (information) to check for hotel affiliations and availabilities (step 206). Context will also be mindful if this is the user's first time in a geographic zone, and if so, offer more general information about the overall area (step 206). Context will always include a 911 service that is connected to available services for that location (step 206).

Location updates include vendor or sponsor rules for default display for un-authenticated users and advertising defaults (step 207). This may be managed centrally or at point of service. Location updates include such things as changing promotions based on weather, (e.g., ice cream as it gets hot, and coffee in the morning, beer at five, etc.) (step 207). Location updates can be tied to events, such as sports team items just before a big game that is nearby (step 207). They can try different marketing campaigns and judge line-of-sight response to the corresponding indoor sales (step 207).

The default display updates must take into consideration the casual user that is passive to system 10, and provide appropriate messaging much like any digital billboard or monitor (step 207). If a gas station is co-marketing with the movie theatre next door, a display on the user interface 20 could change with fifteen minutes to go for each movie that they still have seat inventory to accommodate last minute viewers (step 207). This can provide a promotional discount for that time for that movie only (step 207). The theatre owner pays to present a discount, and also discounts the purchase as a means of incremental revenue on a perishable commodity (that seat, that movie time) (step 207). Locational updates would be generally focused on timely opportunities with a direct call to action, supported by the vendor or sponsor, or other entities with inventory (step 207).

Detailed location data may be maintained in the cloud or, if necessary, due to bandwidth constraints, in one embodiment, it may be maintained locally, e.g., step 214, to include the devices and their capabilities at each geographic location (step 208). Each device has associated capabilities (step 208). Wireless access is maintained in the location data to show capabilities of wireless connections and the possibility of supporting devices in the area of wireless access, such as printers, for example (step 208). Detailed location data is maintained for direct advertisers as well as general Global Information System (GIS) information for the area, and ties to all of the location based services, products, events, activities for that area (step 208). Detailed location data would be available to all users to provide a display in a graphic format of the instant surrounding area, streets, stores, facilities. This information would be unbiased by preferences, but complete as to what is known to exist in the vicinity in a generic fashion. The detailed information provides situational awareness of location and surroundings to users. Location data includes the connections and the advertising channels and affiliations of all the available connections (step 208).

Profile management is the process of capturing, updating and maintaining user likes and dislikes (step 209). As such, profile management is a data management function of changes, additions and deletions (step 209). Profile management starts with the user enrolling in the system 10 and identifying user demographics, such as age, gender, home location, and then the process takes the user through various self-paced or iterative methods of selecting major interests and affiliations for which the user chooses to solicit offers corresponding to those interests (step 209).

A user can rank his or her individual preferences on a scale of 1 to 5, where 1 means the preference has little importance to the user and 5 means the preference is of great importance to the user. For example, a sports enthusiast may rank sports a "5" and shopping a "1."

The method 300 also can integrate with a user's social media accounts, such as LINKEDIN, to acquire user preferences as an example of external services integration (step 209). Within the enrollment process, or through later validation, if the user chooses to identify social media preferences and connectivity information, a user can designate a participating social media platform, then the user will be able to check in to the social media platform from any user interface, for example, without even owning a phone, in one embodiment. With social media integration, the user also may decide whether to choose to allow their advertising services to come through based on their proprietary social media advertising methods, or choose to maintain advertising based on user preferences in the system. This system and method acts as a broker in this instance between external social media services and third party vendors in meeting the user's stated preferences. The user has a choice to allow the social media sites to know his or her location in the same manner they do on their mobile device.

In those embodiments including providing third-party information paid for by vendors, the basic tenet of profile management is to enable the user to select from a list of interests that indicate a propensity to purchase or use those items or services for which such information is provided, such that the supporting vendors receive value on their direct marketing efforts corresponding to the user's stated interests (step 209). The user's stated interests are matched against opportunities, not the user per se (step 209). In the preferred embodiment, the user's physical and electronic identity are neither disclosed, nor necessary, to the third-party vendor. The vendors do not solicit the user; they construct campaigns to solicit to the user's stated interests (step 209). For example, if the user states that he or she is looking for cars, then car sellers already would have decided if they wanted to pay for the user, and others with that stated interest, to see their advertisement (step 209). This vendor decision could be in conjunction with other attributes, such as age and gender, to determine the group of users having the highest propensity to purchase through a cost-benefit analysis, based upon the vendor's budget and overall marketing strategy (step 209).

The profile data is created by users with profile management, but can be augmented by other user profiles from a service or application that exists on the Internet, pursuant to the user's explicit request to include those other user profiles (step 210). The existing external data relating to a user profile currently existing, from sources other than directly from the user in the external space, largely, but not entirely, relates to behavior tracking or purchase histories, or stated preferences of affiliation, such as whether a user prefers a window seat in the user's airline preferences (step 210).

Method 200 can match day laborers and available work (step 210). In much the same manner, it can match those for whom the resources for food are limited with resources for meals and food (step 210).

Method 200 is adaptable to the hardware available. If the user interface 20 has a camera, then applications that support cameras are enabled (step 211). If the user interface 20 has speakers, the user can play music. If the user interface 20 has a microphone, the user can record notes or make a call. If the user interface 20 is touch screen only, then authentication may be limited to user id and password (step 211). If the user interface 20 has a card reader or biometric device, method 20 allows their use in authentication (step 211). Other contextual process determinations include determining whether the location is suitable to showing secure data, bandwidth capacity to show real time video web cams of the advertiser's place of business, etc. (step 211). As users request additional services and content providers, each such provider will be asked to provide a method, or preferred method, to provide said services to said users, within the context and scope of the system. Each provider may be asked to pay on an access basis for the extended reach of their applications and services to this system. A facility may be maintained to allow for credential storage to allow for pass through authentication, or in turn to pass credential information directly to the service. In one embodiment, users will be able to logon to the system and method by using their existing accounts at existing external services, such as Google, Facebook, Yahoo, and others. In addition, non-revenue generating applications are also supported for community awareness, club news, events, services and religious groups, in one embodiment. This information is analogous to public service announcements on broadcast television.

Opportunities are matched in method 200 between the user's profile and the available opportunities in context with the user, method of access, location and other contextual influences on the appropriateness of the possible offers (step 213). The actual match process evolves to meet the needs of users and the opportunities that exist (step 213). For simple matches, such as entertainment venues appropriate to single twenty year olds, the process is easy (step 213). As this grows, the user profile, and the profile management, will evolve to help differentiate the users and the offerings to optimize the system 10 (step 213).

Opportunity optimization for mobile users at point of services provides additional functionality (step 213). The optimization allows a user to receive information which the user wants and would use if he or she had only known to ask for it. This service is provided by a service broker which maintains separate user identity and preferences, but passes those preferences anonymously to a consolidated set of vendors that are subject to free market competition and do not ever have a 'captive audience' (step 213). By having the user correctly rate or value his or her preferences, users are afforded the opportunity of having matching information presented quickly, and without having to initiate a specific request.

The method 200 also allows users to turn off all offers. This, in turn, reduces revenue to system 10, but also prevents wasted advertising dollars, so it is beneficial to have such a subset of participants supported by others, much like broadcast television. Participants who choose not to participate commercially, but still use other provided services, add value to those that choose to receive offers based on valid shared preferences and interests.

Local opportunity data also may be moved closer to point of service to speed access of delivery or be passed from the cloud, e.g. servers 40, based Opportunity Data (step 214). This is an enhancement, as needed, to achieve quick delivery of content, such as to a mobile device (step 214). Where bandwidth and other systems permit sufficient response, this local opportunity data can be hosted on servers 40 (step 214). For remote locations using solar cells and satellite connectivity, it may be necessary to move information regarding additional local services to the local device, e.g., kiosk 23 (step 214).

Opportunity data is stored in the cloud for location products and services, and that information is disseminated, based on the location of access, as well as user data and user profile to filter appropriate offers or vendor information (step 215). This data has accounting revenue information associated with each opportunity (step 215). External opportunity data may also be accessible through this facility, and also has associated revenue information. There are growing numbers of marketing firms to specifically support local business; and providing users access to information regarding local business opportunities can be integrated into the services provided on behalf of their clients. Thus, the system provides an equal access platform to third-party vendor offers and their intermediaries, such as marketing firms.

In the present embodiment, the auction/bid process matches opportunities corresponding to user preferences to present to the user the opportunity presented by the highest paid bidder (step 216). Bidders have the option to 'raise' their base price under preset conditions of presentation (step 216). A common practice is envisioned to be 'I will pay 'x' if there are no other competing bids, and pay 'x+' otherwise (step 216). Or bidders could raise their bid if they match more than one target demographic or profile characteristic (step 216). Another form of bid is to agree to pay on a sliding scale beginning with various demographics and stated interests, such as an ad for a used Corvette, priced to sell: male=>30+ =>member of corvette club=>shopping for used car (step 216).

There will be other reasons for vendors to bid up their offers, especially for perishable inventory such as seats at the theatre or restaurant for the early seating. In one form, bidding can be 'x+' with a time constraint on the offer that ends in ten minutes (step 216). The vendors also directly control their advertising budget, they buy x dollars and their ads stop when the budget amount is reached (step 216).

Accounting process (step 217) maintains a journal of offers served and passes that to the accounting data (step 218). This is conventional accounting of the revenue split, and by mutual agreement of the parties and continuing negotiations. The split is provided to the sponsor (ground lease of either equipment or wireless capability). The telecommunications provider (Internet Provider), device provider, application/operating systems, and the cloud based management system. The management system is responsible for maintaining integrity of the identity management data and, most importantly, security of the preferences/profile data and the Personally Identifiable Information (PIA) from all outside sources (step 217).

Accounting data is maintained on server 40 for revenue share purposes (step 218). This is the back office repository that allows real time reporting of campaigns in-progress and period accounting for session and total contribution to revenue disbursements (step 218).

Initial offers and applications are displayed on the user interface (step 219).

The following is an example of how method 200 can be used to provide a user with free content. Suppose a user is in New York City for a meeting at 2:00 p.m. It is 11:30 a.m. and the user is gluten intolerant. This user has rated a dietary preference as the only 5 in his or her profile. The profile indicates to potential third-party vendors that the user is away from home, it is lunchtime at home, and the user is probably looking for a restaurant. The user would use the search functions to find all the restaurants, but the user is counting on one that is nearby that offers a gluten free menu to make the user an offer. In New York City, the user might never have found one nearby, on is or her own, when it was needed. Additionally, if the user requests lodging, the hotel affiliation will result in an offer of the closest room that fits the user's hotel profile, not necessarily at discount, but the hotel wants this user to know that rooms suitable to the user's preference are available and one click away from being reserved. If the user requests airline information, and the system has access to his or her airline preference information, then the system will deliver information as to the current status of the user's flight and weather at destination. After lunch, if the user's preferences include museums, for example, as a strong 4 preference, the user might be provided information that the local museum is offering a special ticket to view a traveling exhibit for $5, good from 1:00 p.m. to 2:00 p.m., two blocks away. After the meeting, the user might also receive an offer for a show that has excess inventory, near the user's hotel, as a result of a 3 for "entertainment and fine dining," or an offer from the hotel for a 2 for 1 dinner buffet, starting at 5:30 p.m., good until 6:00 p.m. All of these would suit the user, based on declared preferences.

On another trip, the user steps off the plane in Beijing. The user profile says English only and interested in history and photography. The user approaches a device and swipes an airline frequent flyer card and the simplified Chinese on the device turns into English and shows the user transportation opportunities to the hotel that include a quick tour of some key points along the way. The user also sees a secondary offer for translation services and prints out an offer for a phone translator for an hourly rate for emergencies. These examples show how users can have control over their digital content to suit their actual desires, not necessarily what they did last week or at some other time in the past. The system and method provides digital augmentation on a just in time basis at a point of service that presents the user with a possible fleeting opportunity, that otherwise would not have been known to the user and, therefore, missed. And most important, the system and method are intended to provide access open to all users, locations, vendors and advertisers, and providing only information the users wish to have delivered. The system and method thereby optimizes both vendor marketing expenses and saves users time and travel costs by presenting the best match close to the user's location.

The invention claimed is:

1. A method for providing electronic content to a user at a publically accessible user interface kiosk based on a user profile and at no cost to the user, said method comprising:

interfacing a plurality of user interface kiosks to a server though a network, wherein the user interface kiosks can receive digital content from the server through the internet and present the digital content to a user and the user interface kiosks are publicly accessible but privately owned by an owning entity;

receiving profile information from a plurality of users and storing the profile information in the server;

receiving digital content information from a plurality of third parties and storing the digital content information within the server;

the server detecting a particular user accessing a particular user interface kiosk, the particular user interface kiosk having a fixed and known geographic location;

the server retrieving the user profile for the particular user and selecting digital content based at least in part on the user profile for the particular user and the geographic location of the particular user interface kiosk, wherein at least a portion of the digital content is limited to be digital content that advertises services from third parties local to the location of the particular user interface kiosk;

the server transmitting the selected digital content to the particular user interface kiosk over the network for presentment on the particular user interface kiosk;

enabling the particular user to engage in general access to internet based services;

obtaining revenue from one or more of the third parties in exchange for presenting the digital content of the one or more third parties on the particular user interface kiosk; and providing at least a portion of the obtained revenue to the benefit of the owning entity to be applied as payment for the particular user interface kiosk;

whereby each of the plurality of user interface kiosks is provided, in part, from the revenue collected from the one or more third-parties.

2. The method of claim 1, wherein the action of receiving digital content further comprises soliciting third parties that are physically located in the vicinity of the particular user to provide digital content corresponding to the user profile of the particular user.

3. The method of claim 2, wherein the action of the server detecting the particular user accessing the particular user interface kiosk further comprises receiving a user request from the particular user interface kiosk to access the digital content and the action of soliciting third parties is conducted in real-time, following the reception of the request.

4. The method of claim 3, further comprising storing the received digital content in a third party database.

5. The method of claim 1, wherein one or more of the plurality of user interface kiosks is a client device owned by the user.

6. The method of claim 1, wherein one or more of the plurality of the user interface kiosks is a multi-function device for public use.

7. The method of claim 1, further comprising the action of receiving authentication information comprising a username and password.

8. The method of claim 1, further comprising the action of receiving authentication information comprising indicia stored on identification media of the user.

9. The method of claim 8, wherein the stored identification media is selected from the group consisting of a credit card, access key, and a merchant card/keyfob, containing the indicia.

10. The method of claim 1, wherein the action of receiving profile information further comprises receiving preferences provided by the user.

11. The method of claim 1, wherein each of the plurality of user interface kiosks presents authentication information and content in a uniform format among authenticated sessions.

12. A system for providing localized electronic content from at least one third-party vendor to a user based at least in part on a user profile and the proximity of the user to the at least one third-party vendor, said system comprising:

plurality of user interface devices, at least one of the user interface devices being associated with an owning vendor and one or more of the plurality of user interface devices being publicly accessible;

at least one computer database containing electronic information, including user profile information relating to a plurality of users, and containing electronic content from a plurality of third-party vendors; and a server communicatively coupled to the plurality of user interface devices through a network and communicatively coupled to the at least one database, the server configured to:

receive authentication information for a particular user, wherein the authentication information is entered at a particular one of the plurality of user interface devices;

identify the location of the particular user interface device from which the authentication information is received;

authenticate the particular user if the authentication information correctly corresponds with previously stored information in the computer database relating to the particular user, thereby allowing the particular user access to the electronic content, wherein the electronic content comprises information from a third party corresponding to a user profile which comprises user preferences, the location of the particular user and the third party is located in the vicinity of the particular use;

obtaining electronic content provided by the third party located in the vicinity of the user, the electronic content being based at least in part on the user profile and the location of the authenticated user interface device;

presenting the electronic content to the particular user interface device;

debiting an account of the third party for the presentment of the electronic content; and crediting an account of the owning vendor associated with the authenticated particular user interface device.

13. The system of claim 12, wherein the server is further configured to solicit electronic content from other third parties in the vicinity of the particular user, which electronic content corresponds to the user profile.

14. The system of claim 13, wherein the server solicits electronic content in real-time, following the reception of authentication information for the particular user.

15. The system of claim 12, wherein the server is further configured to receive electronic content from third parties and store the received electronic content in at least one computer database.

16. The system of claim 12, wherein one or more of the plurality user interface devices is owned by the user.

17. The system of claim 12, wherein the particular user interface device is a kiosk.

18. The system of claim 12, wherein the particular user interface device is a client device.

19. The system of claim 12, wherein the plurality of user interface devices is selected from a group of kiosks comprising standalone public terminals, fuel pumps, airline kiosk and ATM machines.

20. The system of claim 19, wherein each of the plurality of user interface devices is adapted to read authentication information from the group consisting of a credit card, access key, or a merchant card/keyfob, containing stored authentication information.

21. The system of claim 12, wherein the computer database comprises a user profile containing user preferences.

22. The system of claim 12, wherein the user interface device presents authentication information and content in a uniform format among authenticated sessions.

23. The system of claim 12, wherein a single database comprises the computer database containing shared information relating to at least one user and the electronic content from at least one third-party vendor.

24. A method for providing electronic content from a plurality of third-party vendors to a user based on a user profile and the proximity of the user and the plurality of third-party vendors, said method comprising the actions of:
    interfacing a plurality of user interface devices that are disparately located to a server over a network, the plurality of user interface devices configured to receive electronic content from the server and present the electronic content to a user and, at least a subset of the user interface devices being publicly accessible kiosks;
    the server receiving a user profile for each of a plurality of users having authentication credentials to access one or more of the plurality of user interface devices;
    a particular user interface device of the plurality of user interface devices receiving authentication information entered into the particular user interface device from a particular user and transmitting the received authentication information to the server;
    the server identifying the particular user associated with the authentication information and identifying the location of the particular user based on a location of the particular user interface device;
    the server receiving vendor content from at least one third-party vendor over the network;
    the server operating to authenticate the user if the authentication information correctly corresponds with previously stored information of the user, thereby allowing the user access to the electronic content, wherein said content is information from at least one third-party vendor corresponding to a user profile which comprises user preferences;
    enabling the particular use to access the Internet via the particular user interface device;
    the server selecting electronic content based at least in part on the identification of the user, the user profile, the location of the particular user and the location of the third-party vendors being proximate to the particular user; and
    collecting revenue from any third party having electronic content that is presented on any one of the plurality of user interface devices, wherein the user interface devices are associated with an owner-vendor, and providing a portion of the collected revenue to the owner-vendor associated with the user interface device at which the electronic content was presented.

25. A system for providing locally focused electronic content to a user, wherein the electronic content is obtained from a third-party vendors that are in the vicinity of the user, the electronic content being based at least in part on a user profile, said system comprising:
    one or more user interface devices, at least one of the user interface devices being associated with an owner-vendor that pays a fee for being associated with the at least one user interface device;
    at least one computer database containing electronic information, including stored information relating to at least one user, and containing electronic content obtained from at least one third-party vendor; and
    a server communicatively coupled to the at least one computer database and communicatively coupled through a network to the one or more user devices, said server being configured to:
    receive authentication information entered at the user interface device by a user at a known location;
    receive electronic content from at least one third-party vendor that is located within the vicinity of the known location;
    authenticate the user if the authentication information correctly corresponds with previously stored information of the user, thereby
    allow the user access to the electronic content, wherein said electronic content is information from the at least one third-party vendor based on a user profile which comprises user preferences;
    presenting the electronic content to the user interface device; and
    enabling the user to have access to the Internet at the user interface device.

26. The system of claim 25, wherein a single database comprises the at least one computer database containing electronic information, including stored information relating to at least one user, and containing electronic content from at least one third-party vendor.

* * * * *